United States Patent [19]
Stallings

[11] Patent Number: 5,411,312
[45] Date of Patent: May 2, 1995

[54] TAILGATE WIND DEFLECTOR APPARATUS

[76] Inventor: Thomas G. Stallings, 26 Hahn Rd., Westminster, Md. 21157

[21] Appl. No.: 172,920

[22] Filed: Dec. 27, 1993

[51] Int. Cl.⁶ .............................................. B62D 35/00
[52] U.S. Cl. .................................. 296/180.1; 52/473; 276/57.1
[58] Field of Search ........................ 296/50, 57.1, 180.1, 296/180.2, 180.3; 52/473

[56] References Cited

U.S. PATENT DOCUMENTS

| D. 250,014 | 10/1978 | Jensen | D12/196 |
| D. 332,245 | 1/1993 | Powell, Jr. | D12/181 |
| 2,056,123 | 9/1936 | Herz | 52/473 |
| 3,438,167 | 4/1969 | Royston, Jr. | 52/473 |
| 4,475,759 | 10/1984 | Wine | 296/50 X |
| 4,867,499 | 9/1989 | Stephan et al. | 296/50 |
| 4,884,838 | 12/1989 | Slater | 296/180.1 |
| 5,069,498 | 12/1991 | Benchoff | 296/180.1 |

FOREIGN PATENT DOCUMENTS

| 2301752 | 7/1973 | Germany | 52/473 |
| 2912612 | 10/1980 | Germany | 296/180.1 |

Primary Examiner—Dennis H. Pedder

[57] ABSTRACT

A new and improved tailgate wind deflector apparatus includes a base assembly adapted to be connected to a bed of a truck. A plurality of vertical support assemblies are supported by the base assembly. Each respective vertical support assembly includes a wind-deflecting leading edge. A plurality of horizontally oriented, wind-deflecting assemblies are supported by the vertical support assemblies. The horizontally oriented, wind-deflecting assemblies are adapted for deflecting wind away from a tailgate of the truck. The horizontally oriented, wind-deflecting assemblies are curved and are supported on the vertical support assemblies such that a leading edge of a respective horizontally oriented, wind-deflecting assembly is oriented lower than a trailing edge of the respective horizontally oriented, wind-deflecting assembly. In this way, air is deflected by the respective horizontally oriented, wind-deflecting assembly up and over the tailgate. The vertical support assemblies may be triangular in shape, and an apex of the triangular shape corresponds to a respective wind-deflecting leading edge of a respective vertical support assembly.

4 Claims, 2 Drawing Sheets

TAILGATE WIND DEFLECTOR APPARATUS

BACKGROUND OF THE INVENTION

1. Field of the Invention

The present invention relates generally to wind deflectors for trucks and, more particularly, to wind deflectors for deflecting wind away from a tailgate of a pickup truck.

2. Description of the Prior Art

When the bed of a pickup truck is not full and when the tailgate of the truck is in a raised or closed position, the tailgate creates considerable wind resistance as the truck moves through the air. A major deleterious effect of the wind resistance is reduced gas mileage. One solution to the problem that is used by some truck owners is to lower the tailgate to an open position. This solution has a number of significant disadvantages with the main disadvantage being the risk of loss or damage to the tailgate if the truck hits a large bump or pothole in the road. In this respect, it would be desirable if a device for reducing tailgate wind resistance were provided which did not require a tailgate to be lowered to an open position.

Another solution to the problem of tailgate wind resistance is to remove the tailgate and replace it with a nylon net. The time and labor to remove and later replace a tailgate may be substantial. Moreover, a nylon net clearly has substantially less structural strength than a tailgate. In this respect, it would be desirable if a device for reducing tailgate wind resistance were provided which did not require the removal of Moreover, In this respect, it would be desirable if a device for reducing tailgate wind were provided which does not employ a nylon net.

Throughout the years, a number of innovations have been developed relating to reducing the wind resistance due to a tailgate, and the following U.S. patents are representative of some of those innovations: U.S. Pat. Nos. 4,475,759; 4,867,499; 5,069,498; U.S. Pat. No. Des. 250,014; and U.S. Pat. No. Des. 332,245.

More specifically, U.S. Pat. No. 4,475,759 discloses a pickup truck which has a streamlining tailgate. A disadvantage of this tailgate is that it requires removal of the conventional tailgate and replacement with the streamlining tailgate. It would be desirable to avoid the expense and effort to remove a conventional tailgate and replace it. In this respect, it would be desirable if a device for reducing tailgate wind resistance were provided which did not require removal of a conventional tailgate.

U.S. Pat. No. 4,867,499 discloses a louvered tailgate that is a substitute for a conventional tailgate. As discussed above, it would be desirable if a device for reducing tailgate wind resistance were provide which did not require removal of a conventional tailgate.

U.S. Pat. No. 5,069,498 discloses a retractable endgate air foil for a pickup truck. A disadvantage of this device is that it takes up a considerable amount of the bed space of the truck. Preferably, it would be desirable if a tailgate wind deflector did not take up a considerable amount of bed space in the truck.

U.S. Pat. No. Des. 250,014 is like U.S. Pat. Nos. 4,475,759 and 4,867,499 discussed above for the requirement of replacing a conventional tailgate with a new tailgate.

U.S. Pat. No. Des. 332,245 discloses a wind deflector for a tailgate which fits onto the side panels of the pickup truck. In so doing, the wind deflector adds a wind resistant surface to the wind resistant surface already provided by the in-place tailgate. In this respect, it would be desirable if a device for reducing tailgate wind resistance were provided which does not add to the wind resistance engendered by the tailgate.

Still other features would be desirable in a tailgate wind deflector apparatus. As shown in much of the prior art discussed above, wind deflectors are generally oriented horizontally so that deflected wind is lifted up. However, to orient wind deflectors horizontally, vertical supports may need to be provided. Yet the wind deflecting properties of the vertical supports should not be neglected. In this respect, it would be desirable if a device for reducing tailgate wind resistance had vertical supports which have wind-deflecting properties.

As shown in U.S. Pat. No. 4,867,499 discussed above, an unconventional tailgate is disclosed which has a plurality of horizontally oriented louvers to deflect wind from the tailgate. Also as discussed above, it would be desirable not to remove a conventional tailgate and replace it with an unconventional tailgate. In this respect, it would be desirable to retrofit a pickup truck which has a conventional tailgate with a wind deflecting structure that augments, but does not replace, the existing tailgate.

Thus, while the foregoing body of prior art indicates it to be well known to use wind deflectors for pickup truck tailgates, the prior art described above does not teach or suggest a tailgate wind deflector apparatus which has the following combination of desirable features: (1) does not require a tailgate to be lowered to an open position; (2) does not require the removal of the tailgate; (3) does not employ a nylon net; (4) does not require removal of a conventional tailgate; (5) does not add to the wind resistance engendered by the tailgate; (6) has vertical supports which have wind-deflecting properties; and (7) retrofits a pickup truck which has a conventional tailgate with a wind deflecting structure that augments, but does not replace, the existing tailgate. The foregoing desired characteristics are provided by the unique tailgate wind deflector apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a new and improved tailgate wind deflector apparatus which includes a base assembly adapted to be connected to a bed of a truck. A plurality of vertical support assemblies are supported by the base assembly. Each respective vertical support assembly includes a wind-deflecting leading edge. A plurality of horizontally oriented, wind-deflecting assemblies arc supported by the vertical support assemblies. The horizontally oriented, wind-deflecting assemblies are adapted for deflecting wind away from a tailgate of the truck. The horizontally oriented, wind-deflecting assemblies are curved and arc supported on the vertical support assemblies such that a leading edge of a respective horizontally oriented, wind-deflecting assembly is oriented lower than a trailing edge of the respective horizontally oriented, wind-deflecting assembly. In this way, air is deflected by the respective horizontally oriented, wind-deflecting assembly up and over the tailgate.

The vertical support assemblies are triangular in shape, and an apex of the triangular shape corresponds to a respective wind-deflecting leading edge of a respective vertical support assembly. The base assembly includes triangular receptacles for receiving respective triangular-shaped vertical support assemblies. The horizontally oriented, wind-deflecting assemblies include support-receiving apertures that are triangular in shape for receiving the respective triangular-shaped vertical support assemblies.

The base assembly includes a leading edge which is oriented lower than a trailing edge. The base assembly includes attachment apertures which permit passage therethrough of fasteners for attaching the base assembly to the truck bed. The base assembly, the vertical support assemblies, and the horizontally oriented, wind-deflecting assemblies are located on the truck bed a predetermined distance forward of the tailgate such that wind is deflected up and over the tailgate when the horizontally oriented, wind-deflecting assemblies are employed.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

It is therefore an object of the present invention to provide a new and improved tailgate wind deflector apparatus which has all of the advantages of the prior art and none of the disadvantages.

It is another object of the present invention to provide a new and improved tailgate wind deflector apparatus which may be easily and efficiently manufactured and marketed.

It is a further object of the present invention to provide a new and improved tailgate wind deflector apparatus which is of durable and reliable construction.

An even further object of the present invention is to provide a new and improved tailgate wind deflector apparatus which is susceptible of a low cost of manufacture with regard to both materials and labor, and which accordingly is then susceptible of low prices of sale to the consuming public, thereby making such tailgate wind deflector apparatus available to the buying public.

Still yet a further object of the present invention is to provide a new and improved tailgate wind deflector apparatus which does not require a tailgate to be lowered to an open position.

Still another object of the present invention is to provide a new and improved tailgate wind deflector apparatus that does not require the removal of the tailgate.

Yet another object of the present invention is to provide a new and improved tailgate wind deflector apparatus which does not employ a nylon net.

Even another object of the present invention is to provide a new and improved tailgate wind deflector apparatus that does not require removal of a conventional tailgate.

Still a further object of the present invention is to provide a new and improved tailgate wind deflector apparatus which does not take up a considerable amount of bed space in the truck.

Yet another object of the present invention is to provide a new and improved tailgate wind deflector apparatus that does not add to the wind resistance engendered by the tailgate.

Still another object of the present invention is to provide a new and improved tailgate wind deflector apparatus which has vertical supports which have wind-deflecting properties.

Yet another object of the present invention is to provide a new and improved tailgate wind deflector apparatus that retrofits a pickup truck which has a conventional tailgate with a wind deflecting structure that augments, but does not replace, the existing tailgate.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

With reference to the drawings, a new and improved tailgate wind deflector apparatus embodying the principles and concepts of the present invention will be described.

Figure 2:
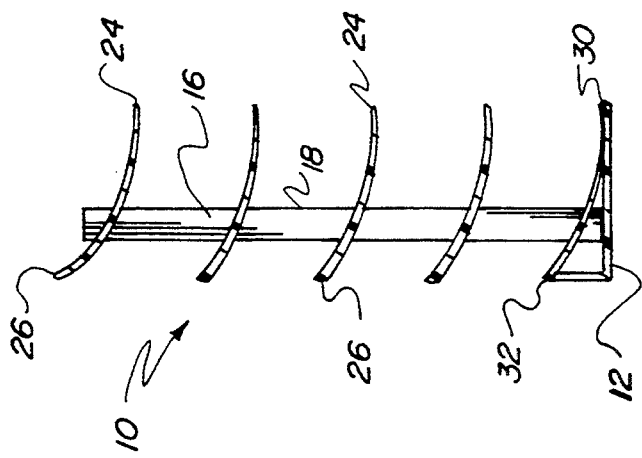
FIG. 2 is an enlarged cross-sectional view of the tailgate wind deflector apparatus along line 2—2 of FIG. 1.
Figure 1:
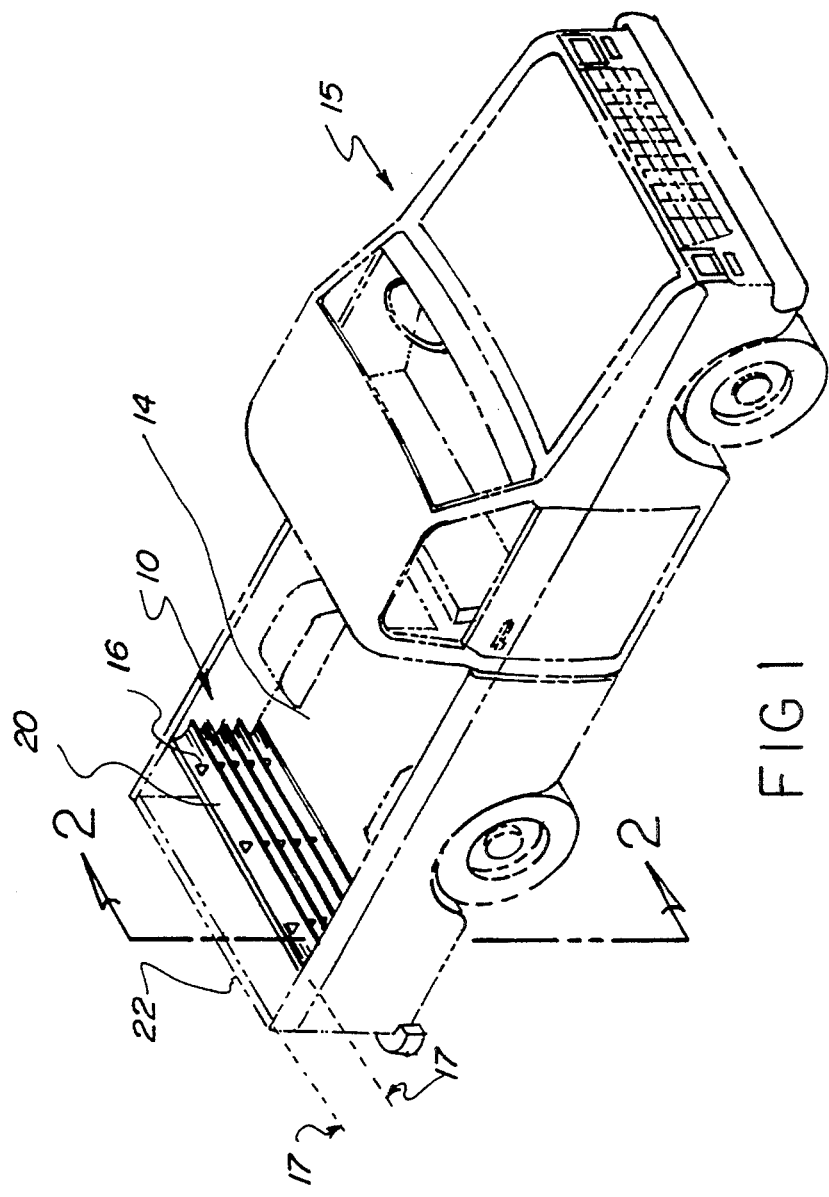
FIG. 1 is a perspective view showing a preferred embodiment of the tailgate wind deflector apparatus of the invention installed on the bed of a pickup truck forward of the conventional tailgate of the truck.
Figure 3:
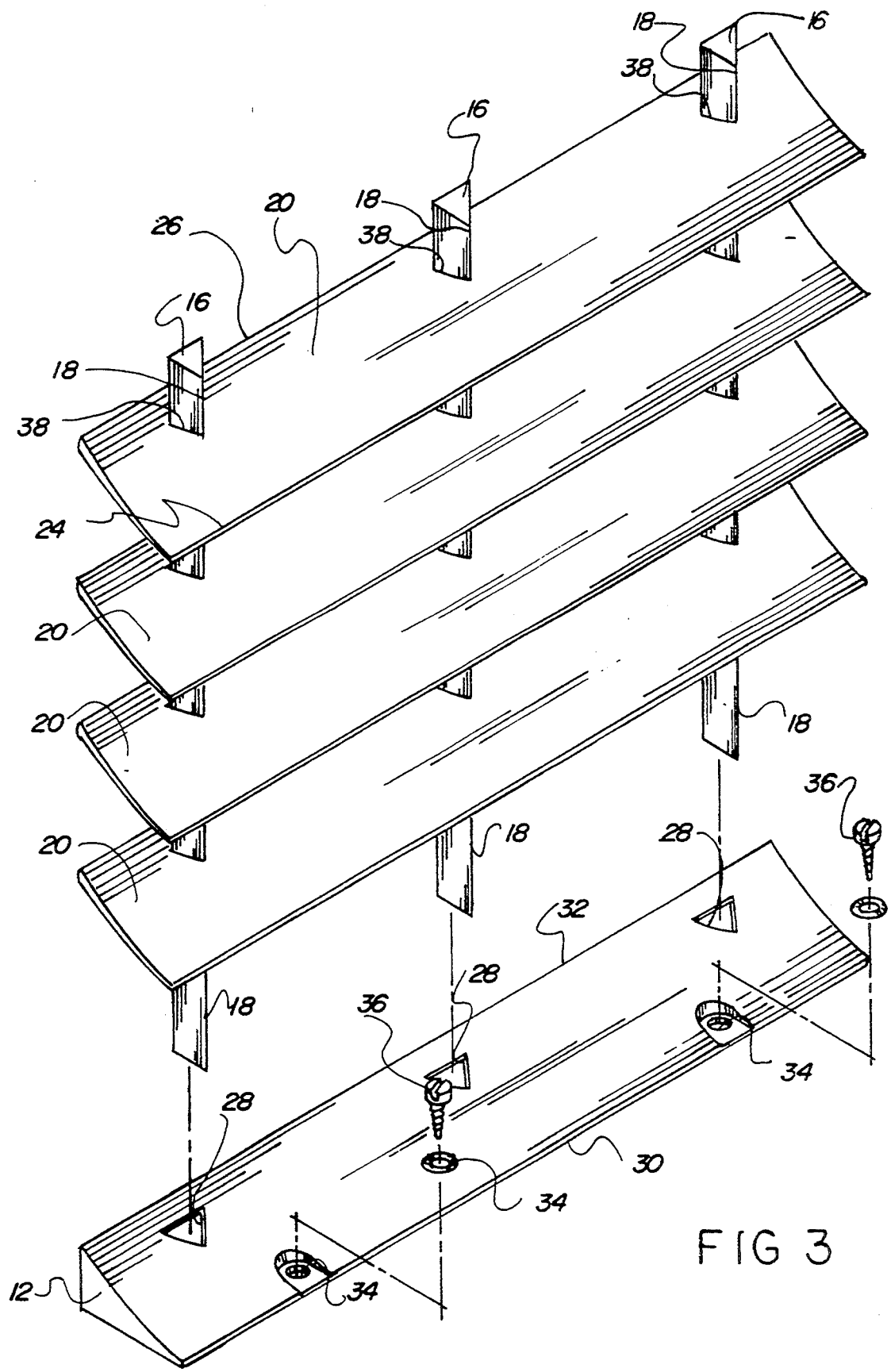
FIG. 3 is a partially exploded view of the embodiment of the tailgate wind deflector apparatus of the invention shown in FIG. 2.

Turning to FIGS. 1-3, there is shown an exemplary embodiment of the tailgate wind deflector apparatus of the invention generally designated by reference numeral 10. In its preferred form, tailgate wind deflector apparatus 10 includes a base assembly 12 adapted to be connected to a bed 14 of a truck 15. A plurality of vertical support assemblies 16 are supported by the base assembly 12. Each respective vertical support assembly 16 includes a wind-deflecting leading edge 18. A plurality of horizontally oriented, wind-deflecting assemblies 20 are supported by the vertical support assemblies 16. The horizontally oriented, wind-deflecting assemblies 20 are adapted for deflecting wind away from a tailgate 22 of the truck 15.

The horizontally oriented, wind-deflecting assemblies 20 are curved and are supported on the vertical support assemblies 16 such that a leading edge 24 of a respective horizontally oriented, wind-deflecting assembly 20 is oriented lower than a trailing edge 26 of the respective horizontally oriented, wind-deflecting assembly 20. In this way, air is deflected by the respective horizontally oriented, wind-deflecting assembly 20 up and over the tailgate 22.

The vertical support assemblies 16 are triangular in shape, and an apex of the triangular shape corresponds to a respective wind-deflecting leading edge 18 of a respective vertical support assembly 16. The base assembly 12 includes triangular receptacles 28 for receiving respective triangular-shaped vertical support assemblies 16. The horizontally oriented, wind-deflecting assemblies 20 include support-receiving apertures 38 that are triangular in shape for receiving the respective triangular-shaped vertical support assemblies 16.

The base assembly 12 includes a leading edge 30 which is oriented lower than a trailing edge 32. The base assembly 12 includes attachment apertures 34 which permit passage therethrough of fasteners 36 such as screws 36 for attaching the base assembly 12 to the truck bed 14. The base assembly 12, the vertical support assemblies 16, and the horizontally oriented, wind-deflecting assemblies 20 are located on the truck bed 14 a predetermined distance 17 forward of the tailgate 22 such that wind is deflected up and over the tailgate 22 when the horizontally oriented, wind-deflecting assemblies 20 are employed.

The components of the tailgate wind deflector apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved tailgate wind deflector apparatus that is low in cost, relatively simple in design and operation, and which may advantageously be used to without requiring a tailgate to be lowered to an open position. With the invention, a tailgate wind deflector apparatus is provided which does not require the removal of the tailgate. With the invention, a tailgate wind deflector apparatus is provided which does not employ a nylon net. With the invention, a tailgate wind deflector apparatus is provided which does not require removal of a conventional tailgate. With the invention, a tailgate wind deflector apparatus is provided which does not take up a considerable amount of bed space in the truck. With the invention, a tailgate wind deflector apparatus is provided which does not add to the wind resistance engendered by the tailgate. With the invention, a tailgate wind deflector apparatus is provided which has vertical supports which have wind-deflecting properties. With the invention, a tailgate wind deflector apparatus is provided which retrofits a pickup truck which has a conventional tailgate with a wind deflecting structure that augments, but does not replace, the existing tailgate.

With respect to the above description, it should be realized that the optimum dimensional relationships for the parts of the invention, to include variations in size, form function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiments of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A tailgate wind deflector apparatus for use with a truck that has a truck bed and a tailgate, comprising:
   a base assembly adapted to be connected to a bed of a truck,
   a plurality of vertical support assemblies supported by said base assembly, said vertical support assemblies including a wind-deflecting leading edge, wherein said vertical support assemblies are triangular in shape, wherein an apex of said triangular shape corresponds to a respective wind-deflecting leading edge of a respective vertical support assembly, and wherein said base assembly includes triangular receptacles for receiving respective triangular-shaped vertical support assemblies, and
   a plurality of horizontally oriented, wind-deflecting assemblies supported by said vertical support assemblies, said horizontally oriented, wind-deflecting assemblies adapted for deflecting wind away from a tailgate of the truck, wherein said horizontally oriented, wind-deflecting assemblies are curved and are supported on said vertical support assemblies such that a leading edge of a respective horizontally oriented, wind-deflecting assembly is oriented lower than a trailing edge of said respective horizontally oriented, wind-deflecting assembly, wherein said horizontally oriented, wind-deflecting assemblies include support-receiving apertures that are triangular in shape for receiving and encompassing said respective triangular-shaped vertical support assemblies, and wherein said base assembly, said vertical support assemblies, and said horizontally oriented, wind-deflecting assemblies are located on and supported by the truck bed a predetermined distance forward of the tailgate such that wind is deflected up and over the tailgate when wind contacts said horizontally oriented, wind-deflecting assemblies.

2. The apparatus described in claim 1 wherein said base assembly includes a leading edge which is oriented lower than a trailing edge.

3. The apparatus described in claim 1 wherein said base assembly includes attachment apertures which permit passage therethrough of fasteners for attaching said base assembly to the truck bed.

4. A method of deflecting wind up and over a tailgate of a truck that has a truck bed, comprising the steps of:
  obtaining a wind deflector apparatus which includes a base assembly adapted to be connected to the truck bed, a plurality of vertical support assemblies supported by the base assembly wherein each of the vertical support assemblies includes a wind-deflecting leading edge, and a plurality of horizontally oriented, wind-deflecting assemblies supported by the vertical support assemblies, wherein said vertical support assemblies are triangular in shape, wherein an apex triangular shape corresponds to a respective wind-deflecting leading edge of a respective vertical support assembly, and wherein said base assembly includes triangular receptacles for receiving respective triangular-shaped vertical support assemblies, and
  said horizontally oriented, wind-deflecting assemblies are adapted for deflecting wind away from a tailgate of the truck, wherein said horizontally oriented, wind-deflecting assemblies are curved and are supported on said vertical support assemblies such that a leading edge of a respective horizontally oriented, wind-deflecting assembly is oriented lower than a trailing edge of said respective horizontally oriented, wind-deflecting assembly, wherein said horizontally oriented, wind-deflecting assemblies include support-receiving apertures that are triangular in shape for receiving and encompassing said respective triangular-shaped vertical support assemblies; and
  connecting the wind deflector apparatus to the truck bed a predetermined distance forward of the tailgate, without being supported by the tailgate, such that wind is deflected up and over the tailgate by the horizontally oriented, wind-deflecting assemblies.

* * * * *